United States Patent [19]
Minter et al.

[11] 3,838,845
[45] Oct. 1, 1974

[54] RATCHET TENSIONING DEVICES

[75] Inventors: Robert Ernest Minter; Derek McDonald Ashbridge, both of Cumberland, England

[73] Assignee: Kangol Magnet Limited, Carlisle, England

[22] Filed: Sept. 24, 1971

[21] Appl. No.: 183,351

[30] Foreign Application Priority Data
Nov. 17, 1970  Great Britain.................. 54639/70

[52] U.S. Cl. ............................................. 254/164
[51] Int. Cl............................................ A63b 61/04
[58] Field of Search.................. 254/163, 164, 167

[56] References Cited
UNITED STATES PATENTS

| | | | |
|---|---|---|---|
| 2,889,136 | 6/1959 | Prete | 254/164 |
| 2,993,680 | 7/1961 | Davis | 254/164 |
| 3,175,806 | 3/1965 | Prete | 254/164 |
| 3,180,623 | 4/1965 | Huber | 254/164 |

*Primary Examiner*—Robert J. Spar
*Assistant Examiner*—George F. Abraham
*Attorney, Agent, or Firm*—Young & Thompson

[57] ABSTRACT

A strap tensioning device has a reel rotatable by a pawl and ratchet mechanism manually operable by a crank arm pivoted on a frame. Release of a detent pawl holding the reel against unwinding is effected by manual movement of a stop normally limiting the return stroke of the crank arm. The stop when so moved can releasably secure the crank arm to the frame in position to release the reel.

13 Claims, 5 Drawing Figures

PATENTED OCT 1 1974 3,838,845

RATCHET TENSIONING DEVICES

The invention relates to ratchet tensioning devices, and in particular to such devices as are manually operable to tension a web or the like, as for retaining cargo in a desired position.

Devices of this kind comprise a frame pivoted to a manually operable crank arm, oscillation of the arm causing a pawl to drive a ratchet wheel and thus rotate a reel to draw up the web or other flexible member, a detent pawl being provided to hold the ratchet wheel against reverse rotation. When the tension of the web has to be released, the ratchet wheel must be freed for rotation accordingly. The object of the invention is to provide improved arrangements for effecting such release.

The invention accordingly provides a ratchet tensioning device comprising a frame, a crank arm pivoted on the frame and manually operable through a tensioning and a return stroke to cause rotation of a ratchet wheel and thereby rotation of a reel for winding up a web, a detent pawl for holding the reel against rotation in a direction to unwind the web, and release means actuable by motion of the crank arm beyond the end of the return stroke to allow rotation of the reel in a direction to unwind the web.

As against providing for release of the ratchet wheel by movement of the crank arm beyond the end of the normal tensioning stroke, the invention affords the advantage that no inadvertent further tensioning will occur when release is desired; moreover there is no possibility of damaging the device in an attempt to release the ratchet wheel by pushing the crank arm beyond its normal range of movement without having effected the further action necessary to permit this.

According to a further feature of the present invention, the driving and detent pawls are arranged to be both disengaged from the ratchet wheel by the same release action.

The invention will be more readily understood from the following description, and the accompanying drawings, given by way of example only. In the drawings.

Figure 1:
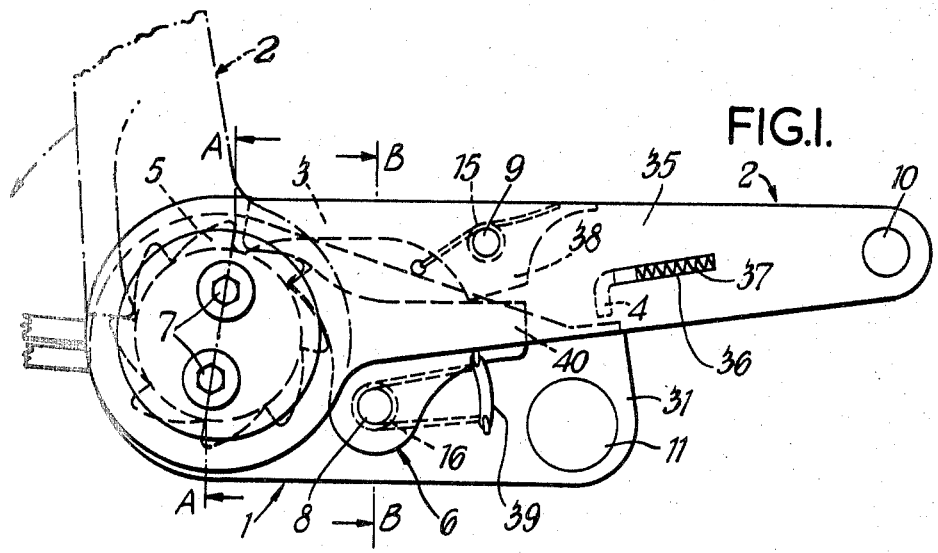
FIG. 1 and 1a are side views of a ratchet tensioning device embodying the invention in different operating positions.
Figure 2:
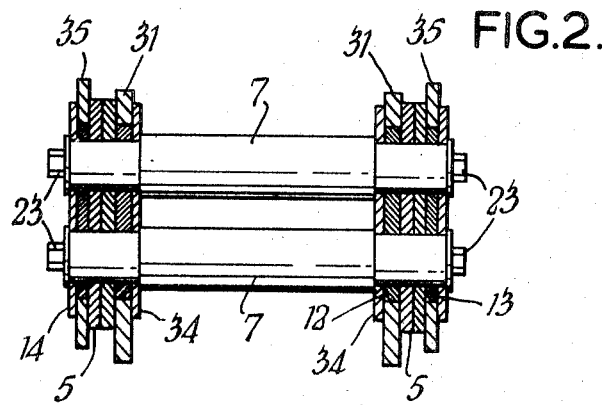
FIGS. 2 and 3 are sectional end views along the lines A—A and B—B respectively of FIG. 1.
Figure 3:
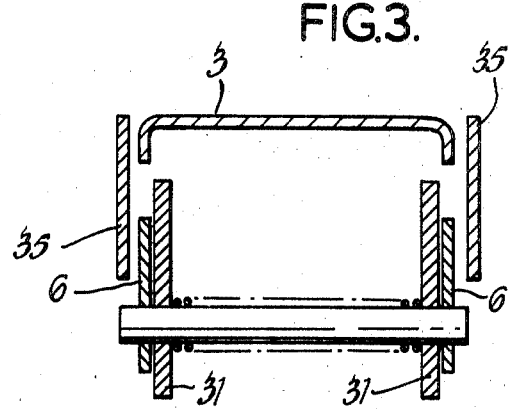

The tensioning device of FIGS. 1, 2 and 3 has a frame 1 with two substantially parallel side pieces 31, spaced apart at one end by a pin 11 for coupling to one end of a web or other tension receiving member. A crank arm 2 of the device is formed of two elongated substantially parallel side pieces 35 spaced wider apart than the frame sidepieces 31 and connected at one end by a pin 10.

The frame 1 and the crank arm 2 are pivotally connected by means of a web-holding assembly comprising a pair of pins 7 each of which has a portion of reduced diameter at each end. This portion extends successively through a retaining washer 34, a bearing 12 in an aperture in the frame side piece 31, a ratchet wheel 5, a bearing 13 in the crank arm side piece 35, and an outer retaining washer 14. An externally threaded stub portion at the end of each pin 7 receives a nut 23 by which the assembly is held together. The axes of the pins are parallel to the axis of the assembly and are equally spaced from this axis along a diameter of the ratchet wheels 5, so that rotation of the ratchet wheels causes a web received on the pins 7 to be wound in or unwound, depending on the direction of rotation.

The crank arm 2 has a normal or inoperative position shown in solid line in FIG. 1 lying substantially flat on the frame 1, but is pivotable about the axis of the web-holding assembly.

The crank arm 2 carries a driving pawl 3, of generally U-shaped cross section, which is pivotally mounted on a shaft 9 extending between the side pieces 35. The driving pawl 3 is biassed by a coil spring 15 on the shaft 9 into engagement with the ratchet wheels 5 the teeth of which are such that anticlockwise rotation of the crank arm 2 from the normal position of FIG. 1 causes the driving pawl 3 to rotate the ratchet wheel 5 in the same direction to tension the web on the pins 7. Return rotation of the crank arm 2 causes the driving pawl 3 to slip over the curved surfaces of the cam portions of the ratchet wheel 5. The driving pawl 3 further has a pair of cam surfaces 38 at a position remote from the ratchet wheels 5.

Between each of the arm side pieces 35 and the adjacent side piece 31 of the frame 1, the latter carries a detent pawl 6, the detent pawls being mounted on a shaft 8 extending between the side pieces 31. Each detent pawl 6 is biassed to engage the associated ratchet wheel 5 by a coil spring 16, each spring extending round the shaft 8 and having one end mounted in a slot 39 in the side piece 31. The other end of the spring 16 engages the lower edge of a cam portion 40 of the detent pawl 6. The detent pawls 6 operate to hold the ratchet wheels 5 against rotation in a direction to release the stored tension but allow rotation of the wheels in a tensioning direction by moving over the curved portions of the teeth of the ratchet wheels.

As shown in FIG. 1, a detent bar 4, which is generally L-shaped in cross-section, is slidably journalled in slots 36 in the side pieces 35 of the crank arm 2 and is biassed by springs 37 into a position where a portion of the bar 4 abuts the side pieces 31 of the frame 1. Thus the crank arm 2 is prevented from being moved beyond the position defined by the detent bar 4 unless the detent bar is moved against its bias to a position beyond the end of the frame 1.

In operation the web is threaded around the pins 7 and pulled by hand so that it is taut. The crank arm 2 is then moved from the normal, solid line, position of FIG. 1, by means of the pin 10 which serves as a hand grip portion, through a tensioning or driving stroke, to the position shown in chain-dotted line in FIG. 1. During this stroke, the driving pawl 3, which is in engagement with the ratchet wheels 5, is rotated about the axis of the web-holding assembly through an angle of approximately 180°, thus similarly rotating the ratchet wheels 5. The consequent rotation of the pins 7 winds the web onto the pins, thereby inducing tension in web. The detent pawls 6 slide over the curved surfaces of the teeth of the ratchet wheels 5. The crank arm 2 is then returned through a return stroke to the original position substantially flat on the frame 1, the detent bar 4 preventing any further motion of the crank arm 2 in that direction. During the return stroke, the detent pawls 6 hold the ratchet wheels 5, so that motion in a direction to unwind the web is prevented. The driving pawl 3 slides over the curved surfaces of the teeth of the ratchet wheels 5.

This intermittent rotation of the ratchet wheels 5 is continued until the web is sufficiently tensioned, whereon the crank arm is returned to its original position flat on the frame.

Figure 1A:
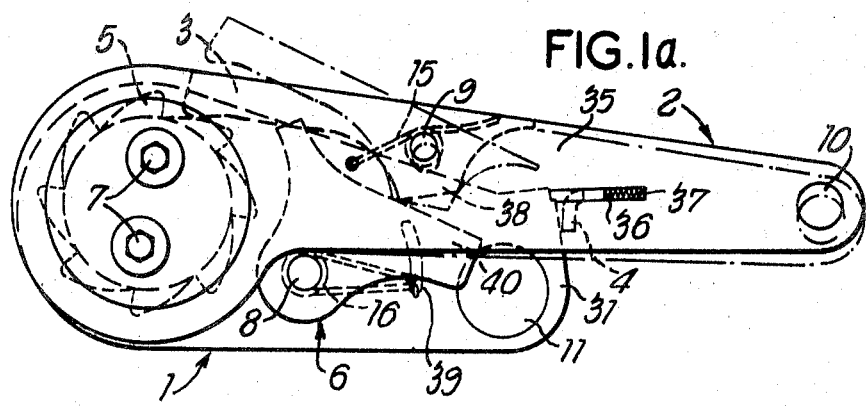

When it is required to release the stored tension by unwinding the web, the detent bar 4 is manually moved in the slots 36 against the bias of springs 37, to the position shown in FIG. 1a, so that it can no longer abut the frame side pieces 31. The crank arm 2 is thus free to be moved beyond the end of the return stroke. Motion of the crank arm 2 towards the frame, causes the cam portions 38 of the driving pawl 3 to engage cam portions 40 of the detent pawls 6, whereon the detent pawls 6 are pivoted about shaft 16 out of engagement with the ratchet wheels 5. The ends of the springs 16 engaging the cam portions 40 slide in the slots 39 until they reach the other end of the springs 16 in the slots 39, whereon further pivotal movement of the detent pawls 6 is prevented. Further motion of the crank arm 2 towards the frame causes the driving pawl 3 to pivot about its mounting shaft 9 and thereby out of engagement with the ratchet wheels. The ratchet wheels 5 are thus free to rotate, whereon the stored tension will cause the wheels 5 to rotate in a direction to unwind the web. When the web is completely unwound and removed, the crank arm can then be returned to the position shown in FIG. 1 with the detent bar 4 in engagement with the frame 1.

Figure 4:
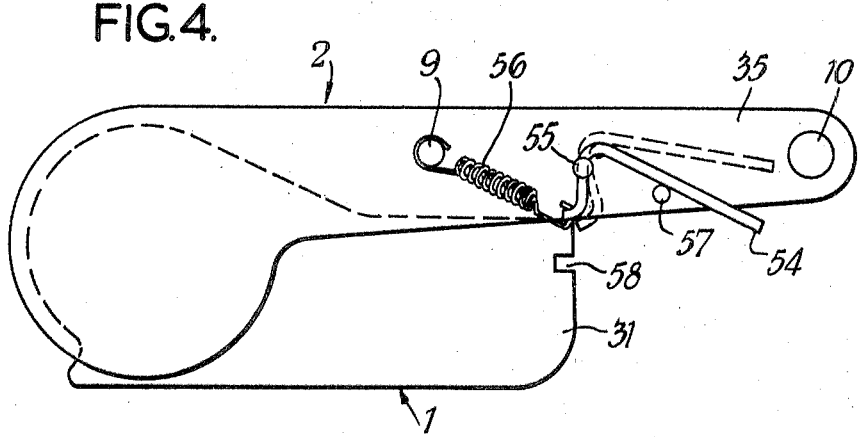
FIG. 4 is a schematic side view of a modified form of the device of FIGS. 1, 2 or 3.

In the modified form of the device shown in FIG. 4, parts 4, 36 and 37 are omitted. Instead a detent bar 54 pivoted on a pin 55 extending between the side pieces 2 is provided. The bar 54 has an abutment portion extending from the pin 55 towards the side pieces 31 of the frame 1, the free end of this portion being connected at its sides to springs 56, of which only one is shown, secured at their other ends to the shaft 9. The springs 56 pull the bar 54 into its normal position shown in full lines, in which the abutment portion engages the frame 1 at the end of the driving stroke, this position being defined by the engagement of stops 57 on the arm 2 by an end portion of the detent bar extending from the pin 55 towards the pin 10.

When the wound web is to be released, the bar 54 is pivoted about the pin 55 by manual pressure on its end portion, against the pull of the springs 56, to the position shown in dotted lines. The crank arm 2 can now be moved further down towards the frame 1, unhindered by the engagement of the bar 54 on the side pieces 31. This further movement effects disengagement of the pawls 3 and 6 from the ratchet wheels 5, as previously explained. In addition however, the bar 54 can engage at its abutment end in notches 58 in the side pieces 31, being retained there by the springs 56. This permits the crank arm 2 to be kept in the release position without the need to apply continued manual pressure.

The invention therefore provides a simple and foolproof ratchet tensioning device which can be released without the possibility of damage by mis-handling when release is desired or of further tensioning before release.

We claim:

1. A device for tensioning an elongated flexible member, comprising reel means, a frame mounting the reel means for rotation in winding and unwinding directions, an arm connected to the frame for pivotal movement relative to the frame to and from a normal position adjacent the frame, drive means driven by the arm upon pivotal movement of the arm to rotate the reel means in the winding direction, stop means normally preventing pivoting of the arm beyond said normal position toward said frame, means for selectively operating said stop means to permit said pivoting beyond said normal position, and detent means normally restraining the reel means against rotation in the unwinding direction but responsive to said pivoting of the arm beyond said normal position to permit rotation of the reel means in the unwinding direction.

2. The device according to claim 1 in which said drive means is responsive to said pivoting of the arm beyond the normal position to disengage the arm from the reel.

3. The device according to claim 1, and a ratchet wheel rotatable with said reel means, said detent means comprising a detent pawl mounted on the frame and spring means urging said detent pawl to engage said ratchet wheel to normally retain said reel means against unwinding rotation, and disengagement means to disengage the detent pawl from said ratchet wheel against the action of said spring in response to movement of said arm beyond said normal position thereof.

4. The device according to claim 3, the drive means comprising a drive pawl mounted on the arm and a second spring urging said drive pawl to engage the ratchet wheel, and second disengagement means to effect disengagement of the drive pawl from the ratchet wheel against the action of the second spring in response to said movement of the arm beyond the normal position thereof.

5. The device according to claim 4, said first and second disengagement means comprising portions of said detent pawl and said drive pawl respectively, abutment of said portions together effecting the disengagement of said detent pawl and said drive pawl.

6. The device according to claim 5, said portions being shaped to effect said disengagement of the drive pawl subsequently to said disengagement of the detent pawl.

7. The device according to claim 1, the stop means comprising a detent member movable between a first position defining said normal position of the arm and a second position permitting the movement of the arm therebeyond.

8. The device according to claim 7 and spring means urging said detent member to said first position thereof.

9. The device according to claim 8 the detent member being carried on the arm, said normal position of the arm being defined by engagement of said detent member with the frame.

10. The device according to claim 9 the detent member being a bar, there being slots in said arm, and said bar being slidable in said slots.

11. The device according to claim 9 the detent member being a bar, said arm comprising side pieces and a pin extending therebetween, and said bar being pivotally mounted on said pin.

12. The device according to claim 11 there being a notch in the frame, said bar being engageable with said notch for releasably holding the arm beyond said normal position thereof.

13. A device according to claim 1 and means for releasably retaining the arm beyond said normal position thereof.

* * * * *